Oct. 3, 1933.　　　C. T. McILYAR　　　1,929,326
LAWN MOWER SHARPENER
Filed Oct. 22, 1932
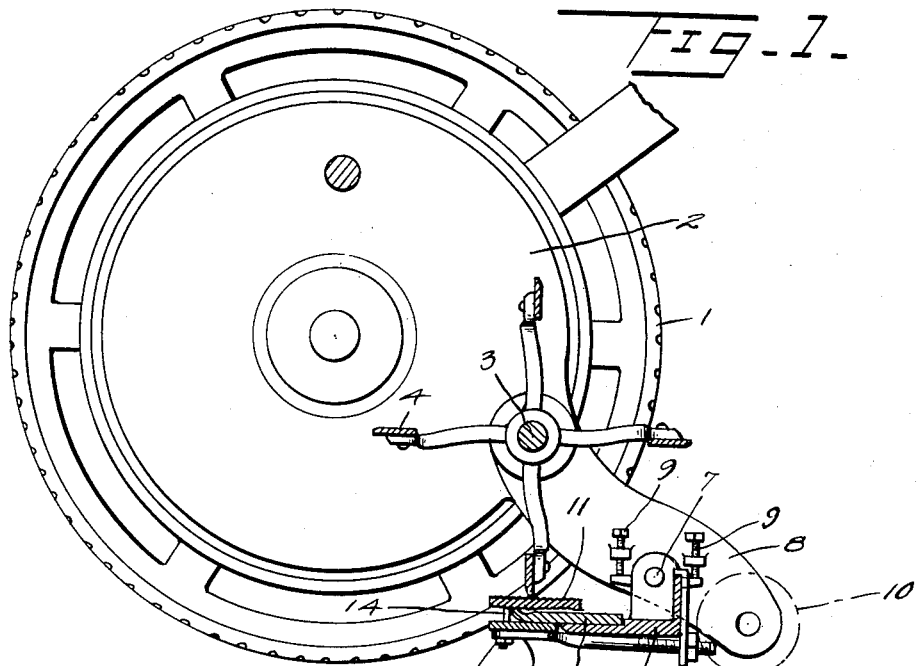
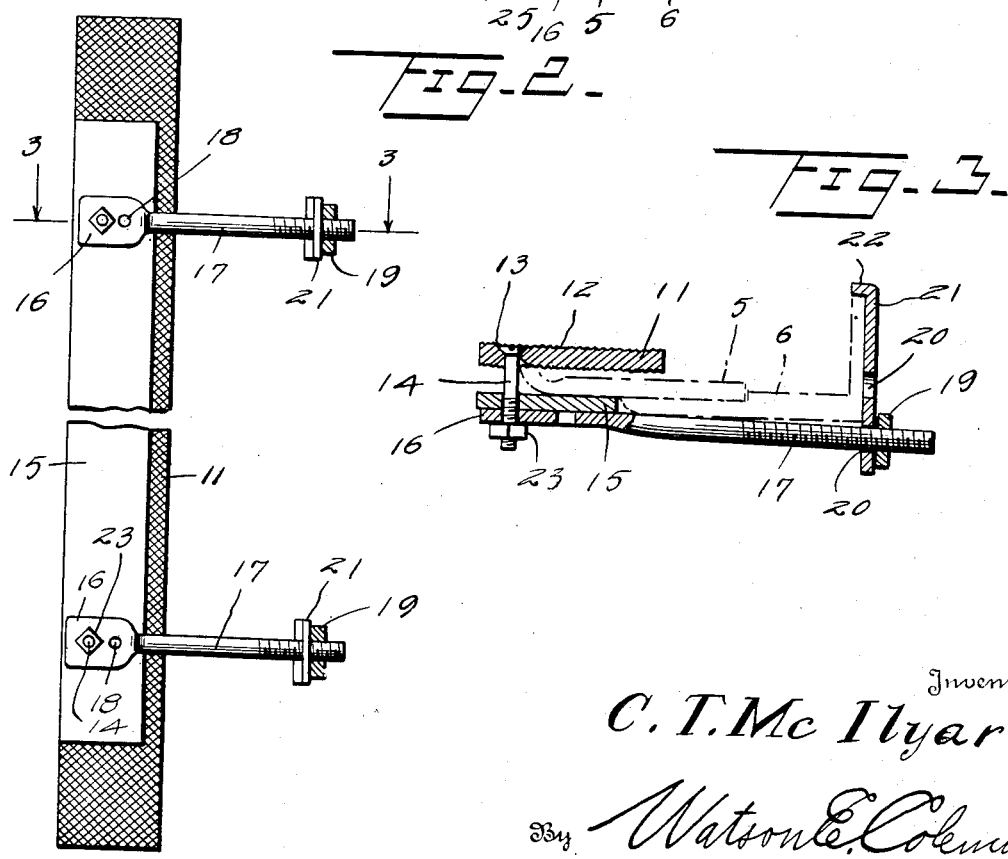
Inventor
C. T. McIlyar
By Watson E. Coleman
Attorney Patented Oct. 3, 1933

1,929,326

UNITED STATES PATENT OFFICE 1,929,326

LAWN MOWER SHARPENER

Charles T. McIlyar, Marietta, Ohio

Application October 22, 1932. Serial No. 639,085

3 Claims. (Cl. 76—82.1)

This invention relates to improvements in devices for sharpening the blades of a lawn mower.

The primary object of the present invention is to provide a device whereby the reel blades of a lawn mower may be sharpened without removing the same from position.

Another object of the invention is to provide a device for sharpening the reel blades of a lawn mower which is designed to be applied to the cutter bar so that the blades may be made to wipe across the sharpening element and thereby sharpened and at the same time trued for correct contact with the cutter bar.

A further object of the invention is to provide a device for sharpening and truing the reel blades of a mowing machine which may be easily and quickly placed in position for use with only a slight change in the mowing machine structure.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in transverse section of a lawn mower showing the application of the sharpening device to the cutter bar thereof;

Figure 2 is a view in plan of the under side of the sharpening device;

Figure 3 is a view in transverse section taken upon the line 3—3 of Figure 2, the same being upon an enlarged scale.

Referring now more particularly to the drawing wherein like numerals of reference indicate corresponding parts throughout the several views, the numeral 1 indicates the driving wheel at one end of a lawn mower with the frame portion 2 of which is connected one end of the rotatable shaft 3 upon which the reel blades 4 are carried. The mower cutter bar is indicated by the numeral 5 and this is shown mounted upon the usual support bar 6 which is oscillatably carried at each end upon a pin 7 supported by the adjacent rearwardly extending portion 8 of the machine.

The usual adjusting screws for regulating the position of the cutter bar 5 with respect to the cutting edges of the blades 4, are indicated by the numerals 9 and the usual supporting roller at the rear of the machine is shown in dotted lines and indicated by the numeral 10.

The sharpening device embodying the present invention consists of the sharpening bar or file bar 11 which has both side faces provided with file teeth as indicated at 12. This file bar is provided adjacent each end with an aperture 13 which is counter-sunk on both sides of the bar as shown so that whichever toothed surface of the file bar is uppermost when in use the head of the stove bolt 14 which is extended therethrough will have its top surface below the top face of the file.

Each of the openings 13 has the stove bolt therein and this bolt also passes through an underlying clamp bar 15 which extends parallel with the under face of the file.

Connected with each of the bolts 14 at the side of the clamp bar 15 remote from the file 11 is the flattened head 16 of the elongated bolt 17. The end of each bolt 17 remote from the head 16, which as shown is provided with two openings which are indicated by the numerals 18 and through one of which the bolt 14 passes, is screwthreaded to receive a nut 19.

This threaded end of each bolt 17 passes through one of the two apertures 20 in a clamp bracket 21, one end of which is provided with the annular flange 22 as shown in Figure 1 and 3.

In applying the present sharpener for use the supporting roller 10 of the mower is removed and the adjusting bolts 9 are manipulated so that the edge of the cutter bar 5 will be dropped down away from the lowermost blade 4 a sufficient distance to permit of the insertion of the file 11 between the cutter bar and the overlying one of the blades. The clamp bar 15 will be positioned beneath the cutter bar and the nut 23 upon the bolt 14 is then tightened up so as to securely bind the cutter bar between the file 11 and the clamp bar.

The clamp brackets 21 are then placed in position on the outer ends of the bolts 17, the flat heads of which are held against the clamp bar 15 and the nut 23 in the manner illustrated and the nuts 19 are threaded onto the bolts 17 to draw the brackets 21 up against the rear of the cutter bar support 6 with the flanged edges thereof engaging over the top edge of the support. The necessary readjustment is then made of the screws 9 to raise the file 11 to the position where the edges of the blades 4 will sweep over the surface of the file when the shaft 3 is rotated.

The shaft and blades may then be turned by hand so as to slowly pass the cutting edges of the blades over the file and thus the edges will be sharpened and cut down to a smooth surface and will be properly aligned with the edge of the cutter bar with which the top surface of the file is parallel. After removing the sharpening device from the cutter bar the screws 9 will then be adjusted so as to move the edge of the cutter bar back into the position where the edges of the blades will pass thereover in the proper relation to effect a cutting of the grass.

Having thus described the invention, what is claimed is:—

1. A sharpener for a lawn mower having a rotating blade structure and a fixed cutter bar coacting therewith, comprising an elongated flat sharpening body, an elongated flat bar in parallel relation with the sharpening body, bolt means connecting the body and the clamping bar, a pair of bolts connected with the clamping bar, and clamp brackets carried by said last mentioned bolts, said sharpening body and clamping bar receiving the cutter bar therebetween and said clamping brackets being designed to engage the back edge of the cutter bar.

2. A sharpener for a lawn mower having rotatable cutting blades and a fixed cutter bar, comprising a pair of elongated rigid bodies, one of which bodies constitutes a sharpening element, between which bodies the cutter bar is located with said element on top, means connecting said bodies for drawing the same together against the interposed bar, said connecting means extending across the forward edge of the bar, an element extending rearwardly from the other body beneath said bar, and means for detachably coupling said element to the bar at the rear of the latter.

3. A sharpener for a lawn mower having rotatable cutting blades and a fixed cutter bar, comprising a pair of elongated rigid bodies, one of which bodies constitutes a sharpening element, between which bodies the cutter bar is located with said element on top, means connecting said bodies for drawing the same together against the interposed bar, said connecting means extending across the forward edge of the bar, and a holding element connected with the under one of the bodies and attached to the rear of the bar for preventing forward movement of the bodies.

CHARLES T. McILYAR.